UNITED STATES PATENT OFFICE.

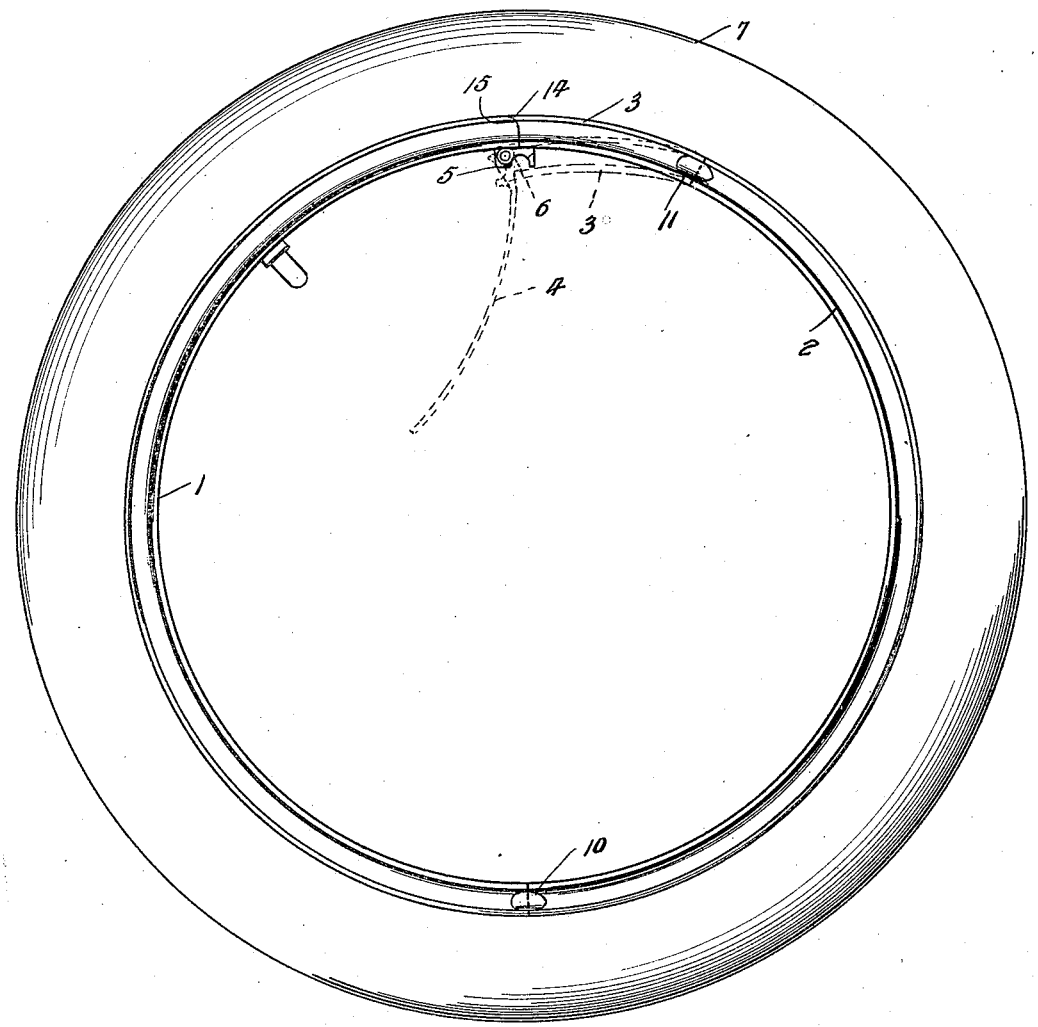

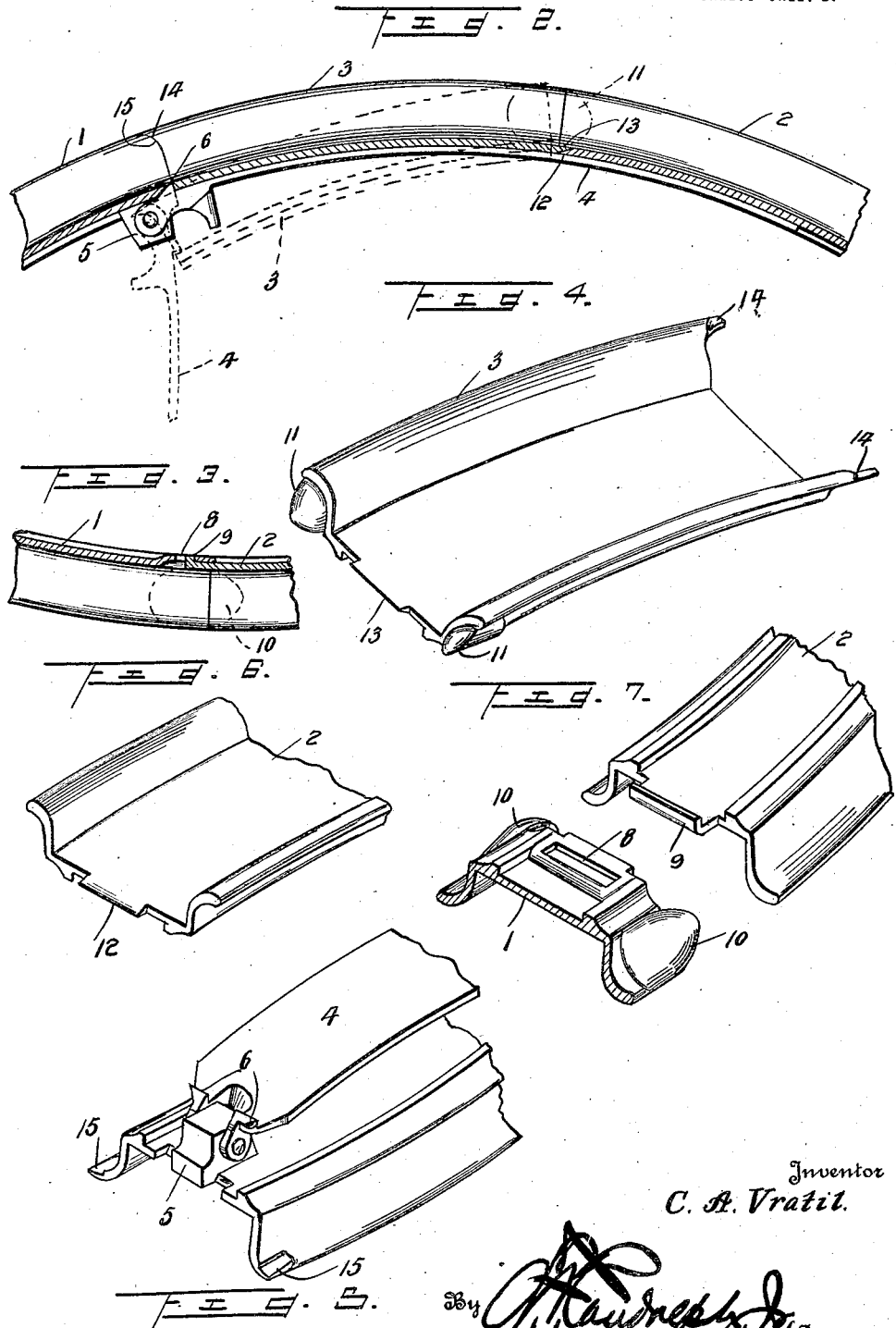

CHARLES A. VRATIL, OF PAWNEE ROCK, KANSAS.

DEMOUNTABLE RIM.

1,414,844.  Specification of Letters Patent.  Patented May 2, 1922.

Application filed April 12, 1921. Serial No. 460,744.

*To all whom it may concern:*

Be it known that I, CHARLES A. VRATIL, a citizen of the United States, residing at Pawnee Rock, in the county of Pawnee and State of Kansas, have invented certain new and useful Improvements in Demountable Rims; and I do hereby declare the following to be a full, clear, and exact description of the invention, such as will enable others skilled in the art to which is appertains to make and use the same.

The invention relates to demountable rims for tires and has for its object the provision of a rim which admits of the tire being quickly and conveniently applied thereto and removed therefrom without the use of tools of any description other than a lever which is permanently attached to the rim.

A rim constructed in accordance with this invention is of sectional formation, usually two large main sections and one short key section, the abutting ends of the sections having projecting elements to retain the sections in position and assure their alinement when assembled. A lever fulcrumed on one of the main sections cooperates with the key section to positively move it in both directions when it is required either secure or release the rim.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be restorted to without departing from the nature of the invention.

Referring to the accompanying drawings forming a part of the specification,

Figure 1 is a side view of a rim embodying the invention, having a tire in position, the full lines showing the relative position of the sections in normal operative position and the dotted lines indicating an adjusted position of the key and relatively movable main sections.

Figure 2 is a sectional detail of the key section and the contiguous ends of the main sections, the full lines showing the normal operative position of the parts and the dotted lines an adjusted position thereof, Figure 3 is a sectional detail of the joint formed between the main sections, Figure 4 is a perspective view of the key section, Figure 5 is a perspective view of the end of the main section carrying the operating lever.

Figure 6 is a perspective view of the end of the other main section cooperating with the key section, and Figure 7 is a perspective view of the adjacent ends of the main sections, the same being separated and disposed in relative cooperative position.

Corresponding and like parts are referred to in the following description and designated in the several views of the drawings by like reference characters.

The rim comprises two large main sections 1 and 2 and a relatively short key section 3. The main section 1 is relatively fixed and is apertured to receive the stem of the inner tube and receives the operating lever 4 which is pivotally connected thereto. The operating lever 4 is flat and curved throughout its length to conform to the diameter of the rim so as to lie snug against the inner wall thereof between the usual inner beads. The lever 4 is pivoted to a lug 5 at the end of the section 1 adjacent the key section 3 and is provided near its pivotal end with an inner projection 6 adapted to engage the outer surface of the key section 3 so as to move the swinging end of the key section inward when operating the lever 4 to break the joint preliminary to dismounting a tire. The rim has the usual side flanges for engagement with the beads of the tire 7 whereby to retain the latter in position on the rim.

An opening 8 is formed in the opposite end of the section 1 to receive a hook 9 at the adjacent end of the section 2 whereby to connect the abutting ends of the sections 1 and 2. Projections 10 overlap the joint formed between the sections 1 and 2 and are carried by one of said sections as 1. The projections 10 maintain the abutting ends of the sections 1 and 2 in alinement. Projections 11 overlap the joint formed between the sections 2 and 3 and are carried by one of said sections, preferably the key section. A lip 12, at the end of the section 2, cooperates with a companion lip 13 at the adjacent end of the key section 3, whereby to prevent relative inward movement of the end of the key section adjacent the main section 2. The lip 12 overlaps the lip 13 and both lips are beveled to admit of their combined thickness corresponding with the thickness of the metal comprising the rim. Projections 14, at the relatively swinging end of the key section, are adapted to overlap the adjacent end of the section 1, said projections 14 tapering to match corresponding tapering seats 15 at the abutting end of the section 1.

When mounting a tire, the section 1 is placed in position with the valve stem passing through the opening thereof. The section 1 is relatively fixed. The section 2 is next placed in position with the hook 9 thereof engaging the opening 8 of the section 1. Finally the key section 3 is placed in position with its lip 13 underlapping the lip 12 of the section 2 and with its swinging end resting on the projection 6 of the lever 4. During these preliminary steps the lever 4 occupies a position with its free end resting against the section 1. Upon swinging the lever 4 towards the section 2, the sections 2 and 3 are moved so as to fit close against the inner side of the tire 7. During the movement of the lever 4, the contiguous or swinging end of the key section 3 is moved outwardly and the rim is simultaneously expanded to its maximum extent to snugly fit the tire. When the rim is properly applied, the several sections aline circumferentially and the lever 4 rests snugly against the inner side of the sections 2 and 3. When it is required to dismount the tire, the outer end of the lever 4 is moved inwardly away from the section 3 and the swinging end of said key section is moved inwardly in a positive manner by reason of the projection 6 of the lever 4 being in contact with its outer side. This breaks the rim joint and loosens the sections which may be easily and conveniently removed. It will thus be understood that the tire may be mounted and dismounted without having recourse to the use of tools of any nature.

What is claimed is:

1. A sectional demountable rim, contiguous ends of adjacent sections having terminal projections to overlap the joint to insure alinement and prevent displacement of the sections, and an operating lever mounted on an end of one of the sections and having a projection adjacent its pivotal end to extend between the joint of said section and the adjacent section to positively break the joint inwardly and to engage the end of the swinging section and move the same outwardly.

2. A demountable rim comprising two main sections and a key section, one of the main sections having an opening and the contiguous end of the adjacent section having a hook to engage the said opening, projections overlapping the joints between the several sections and carried by one of the sections, terminal lips between contiguous ends of the key and main sections, and an operating lever mounted upon a main section and having an inner projection to overlap the outer side of the key section, said operating lever effecting positive movement of the key section inwardly and outwardly, and said operating lever being curved and adapted to lie snugly against the inner side of the rim.

In testimony whereof I affix my signature in presence of two witnesses.

CHARLES A. VRATIL.

Witnesses:
CLYDE D. BLOUNT,
CHARLES H. PRICE.